United States Patent
Cheng

(10) Patent No.: US 6,434,634 B1
(45) Date of Patent: Aug. 13, 2002

(54) METHOD AND APPARATUS ADAPTABLE TO A STANDARD GAME PORT OF A PERSONAL COMPUTER FOR INTERFACING AN EXTERNAL HSP MODEM, A JOYSTICK AND A MIDI INTERFACE

(75) Inventor: Chi-Chen Cheng, Taipei (TW)

(73) Assignee: C-Media Electronics Inc., Taipei (TW)

( * ) Notice: Subject to any disclaimer, the term of this patent is extended or adjusted under 35 U.S.C. 154(b) by 0 days.

(21) Appl. No.: 09/225,589

(22) Filed: Jan. 6, 1999

(51) Int. Cl.$^7$ ............................................ G06F 13/14
(52) U.S. Cl. .................. 710/18; 710/2; 710/8; 710/37; 709/250
(58) Field of Search ........................ 710/18, 2, 8, 37; 709/250

(56) References Cited

U.S. PATENT DOCUMENTS

| | | | | |
|---|---|---|---|---|
| 4,349,870 A | * | 9/1982 | Shaw et al. ................. 364/200 |
| 4,381,543 A | * | 4/1983 | Bunten, III et al. ........ 364/200 |
| 4,692,120 A | * | 9/1987 | Feinstein .................... 439/62 |
| 5,408,614 A | * | 4/1995 | Thornton et al. ........... 395/275 |
| 5,499,108 A | * | 3/1996 | Cotte et al. ................. 358/400 |
| 5,555,436 A | * | 9/1996 | Cavish ......................... 710/1 |
| 5,644,593 A | * | 7/1997 | Bailey et al. ............... 345/222 |
| 5,807,175 A | * | 9/1998 | Davis et al. ................. 463/36 |
| 5,910,978 A | * | 6/1999 | Maytal et al. ............. 379/93.01 |
| 5,991,830 A | * | 11/1999 | Beard et al. ................. 710/18 |
| 6,009,151 A | * | 12/1999 | Staples ..................... 379/90.01 |
| 6,115,755 A | * | 9/2000 | Krishan ...................... 709/250 |
| 6,225,977 B1 | * | 5/2001 | Li .............................. 345/156 |

* cited by examiner

Primary Examiner—Jeffrey Gaffin
Assistant Examiner—Abdelmoniem Elamin
(74) Attorney, Agent, or Firm—Baker Botts LLP

(57) ABSTRACT

A new protocol of a standard game port for interfacing an external HSP modem, and game port devices is disclosed. The invention provides an external HSP modem housed in a compact case which includes a connector for mounting on a PC game port and a connector for coupling to a joystick and a MIDI interface. Inside the case, a bridge module is coupled to a modem module to forward the modem data input in response to a plurality of serial port clocks. The modem data input is then forwarded to an encode/decode module via multiple redefined read-only ports. The encode/decode module is on a sound chip for restoring the modem data input to their original formats. The restored data will be forwarded to a system bus for CPU to access via an HSP modem interface. The signal transmissions for the joystick and the MIDI I/O device are basically the same because the bandwidth of the game port is still enough if the modem, the joystick, and the MIDI I/O device are operated simultaneously. Consequently, the invention allows a computer system to simultaneously communicate with an HSP modem, and game port devices without burdening down the system performance.

41 Claims, 6 Drawing Sheets

METHOD AND APPARATUS ADAPTABLE TO A STANDARD GAME PORT OF A PERSONAL COMPUTER FOR INTERFACING AN EXTERNAL HSP MODEM, A JOYSTICK AND A MIDI INTERFACE

BACKGROUND OF THE INVENTION

A. Field of the Invention

The present invention relates to a method and apparatus for interfacing an external Host Signal Processor modem (hereinafter referred to as HSP modem), a joystick, and a MIDI interface, especially to a method and apparatus adaptable to a standard game port of a personal computer for allowing system to simultaneously communicate with an external HSP modem, a joystick and a MIDI interface.

B. Description of the Prior Art

Commercially available modem adapters are characterized as either internal or external modems. The external modem is a standalone device which communicates with a host computer via a serial communication port. It includes two phone jacks residing on the circuit board of the modem for connecting to a telephone line and a telephone set. The circuit board of the external modem contains a dedicated processor, usually a digital signal processor (hereinafter referred to as DSP), for performing mathematical manipulations of data to be in a format compatible with analog public switched telephone networks (hereinafter referred to as PSTNs).

Since the DSP is a relatively expansive chip, an internal modem, also called an HSP modem, is developed to replace an external modem. The HSP modem includes two major portions: a modem module which is mounted on an internal modem adapting card for plugging into a card slot and communicating with a system bus, and a software portion which is executed by CPU to compute the data, commands, and protocols from the modem module. In contrast to the external modem, the data from modem module is raw data with high frequencies which is so large in size that these data must be accessed by CPU via ISA bus or PCI bus rather than serial communication ports.

To furnish the function of an HSP modem, many motherboard manufactures provide an on-board internal modem adapting card and an HSP modem interface. At the time when a user purchases a personal computer, he/she can communicate with the Internet simply by plugging the phone jack of a telephone line to the connector of the internal card. The operating system running on the personal computer can even allow the plug-and-play function of the internal modem adapting card. However, this advantage may sometimes become a waste when a user would connect to the Internet via dedicated networks instead of PSTNs. In such case, it would also be a waste for motherboard manufactures to provide a device which is not in use.

An HSP modem depends on the software engine to perform the functions of modulation and demodulation and the software engine cannot communicate with an external modem. For this reason, if the motherboard manufactures would not provide the internal modem adapting card and interface, the user would have to rely on an external modem to connect to PSTNs. Moreover, major manufacturers of HSP modems, such as PCTEL, Motorola, and Rockwell, do not provide connection links and protocols to communicate a standard PC port for external modems. In other words, there is no interface port on the game port available for communicating the software engine of an HSP modem with an external modem if a user would upgrade his/her computer system to support modem functions later on.

It would be advantageous to provide a new protocol for communicating the software engine of an HSP modem with a standard interface port without having to revise the software engine of an HSP modem and allow an external modem to be readily adaptable to an HSP modem software engine. Consequently, motherboard manufactures would not have to provide on-board internal modem adapting card in advance, thereby to reduce manufacture cost. A user can also upgrade his/her system easily by plugging an external modem adapter into a standard interface port to operate with HSP modem software engine.

SUMMARY OF THE INVENTION

Accordingly, it is an object of the present invention to provide a method and apparatus which can interface an external HSP modem, a joystick and a MIDI interface, thereby allowing system to simultaneously communicate with an HSP modem, a joystick and a MIDI interface.

It is another object of the present invention to provide a new protocol of game port for communicating an external HSP modem with a standard HSP modem software engine.

It is a further object of the present invention to provide an external HSP modem which can communicate with an HSP modem software engine and completely transparent to peripheral devices on game port, thereby saving a PC card slot.

It is yet still another object of the present invention to provide a solution for motherboard manufactures so that they would not have to implement an internal modem adapter card before requested by users.

The preferred embodiment of the present invention includes: an external HSP modem housed in a compact case for coupling to a game port, and an encode/decode device on a sound chip. The case includes one connector residing on one end for mounting on a standard game port, another connector residing on the opposite end for coupling to a joystick and a MIDI interface, and a RJ-11 connector for connecting to a telephone set and PSTNs.

Inside the case, it mainly comprises a modem module, and a bridge interface. The modem module connects to the RJ-11 connector for communicating with the PSTNs and generating a plurality of modulated/demodulated signals which includes data signals and command signals. The modulated/demodulated signals are input to the bridge interface for transferring to/from the game port. The bridge interface encodes/decodes the modulated/demodulated signals input in response to the serial port clocks and then sends the encoded/decoded modulated/demodulated signals to/from an encode/decode device on a sound chip. The encode/decode device then restores the modulated/demodulated signals to its original format and transfers them to a system bus for CPU to access via an HSP modem interface.

Accordingly, the present invention provides a method for interfacing a modem module, a joystick and a MIDI interface on a standard game port of a personal computer. The method comprises the steps of: (1) Redefining a plurality of read-only ports on said game port for transmitting a plurality of modulated/demodulated signals of a modem module. (2) Sending the modulated/demodulated signals to an encode/decode device in the personal computer via the read-only ports for outputting decoded modulated/demodulated signals. (3) Transferring the decoded modulated/demodulated signals to a system bus via an HSP modem interface.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

According to the problems discussed above, the present invention provides a new protocol for a standard game port to communicate an external modem with an HSP modem software engine and still capable of interfacing a joystick and a MIDI interface at the same time.

Figure 1:
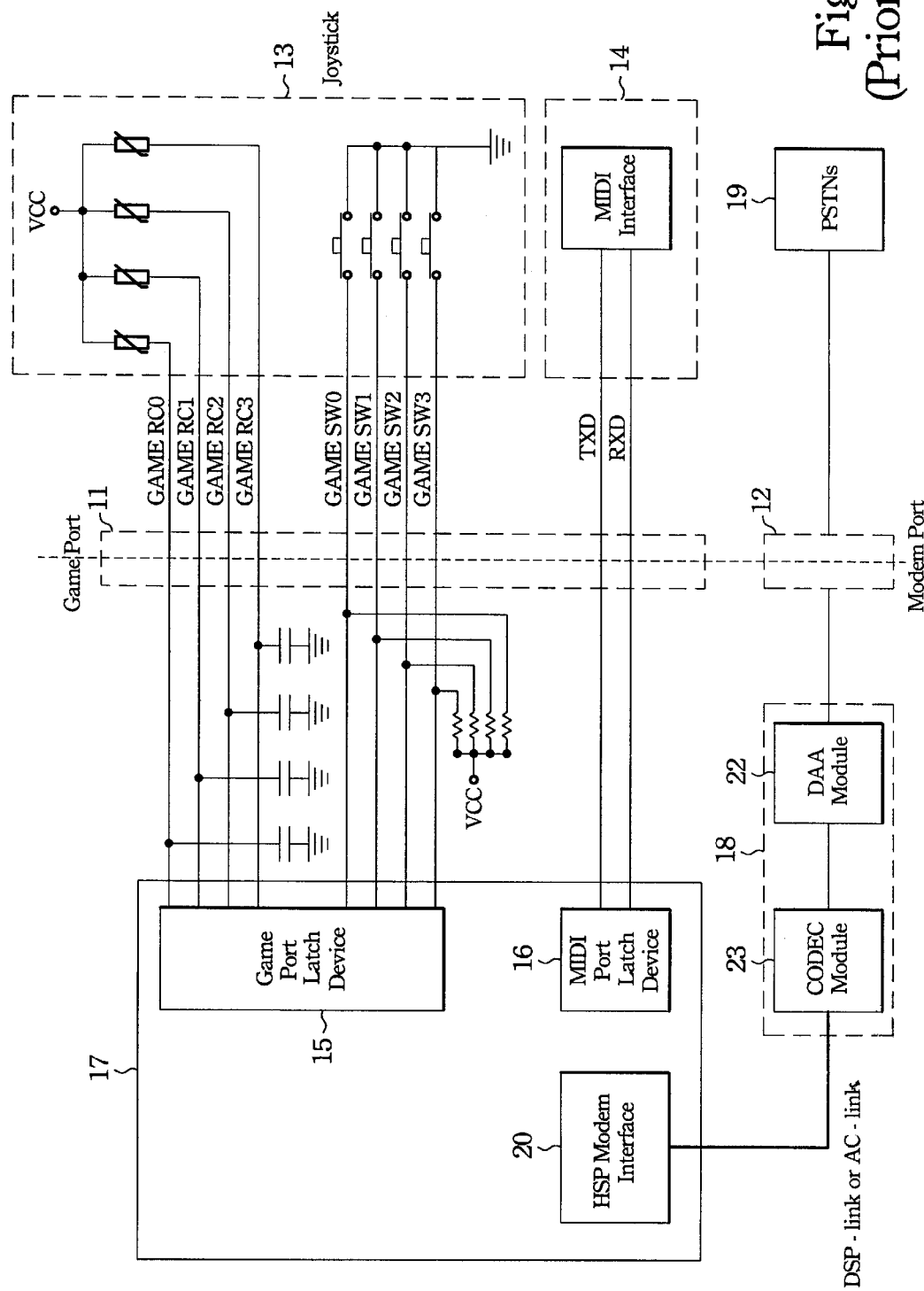
FIG. 1 is a system block diagram showing a conventional HSP modem and a conventional structure for a game port to communicate with a joystick, and a MIDI interface.

With reference to FIG. 1, it shows a conventional game port 11 system and a modem port 12 system. The game port 11 can be mounted by various game port devices, such as joysticks and MIDI keyboards. The game port 11 provides 8-pins for communicating with a joystick 13 and 2-pins for a MIDI interface 14. A game port latch device 15 and a MIDI port latch device 16 are implemented on a sound chip 17 for latching the signals from the joystick 13 and the MIDI interface 14 respectively. On the other hand, the HSP modem includes a software program residing in the CPU (not shown) to perform the functions of a conventional DSP. To communicate with the PSTNs 19, the HSP modem includes an internal modem adapting card (not shown) which is mounted with a chip set 18 for plugging into a PC card slot. The chip set 18 includes a DAA (Data Access Arrangement) module 14, and a CODEC module (Analog to Digital and Digital to Analog Converter) 15 for receiving signals from a telephone line and converting the analog signals to digitized data, commands and protocols. The digitized data will be further sent to a system bus (not shown) via an HSP modem interface 20 for CPU to access.

Typically, a game port 11 has a total of eight input signal ports, four of which receives the directional signals and four of which receive the binary signals generated by a pair of joysticks 13. While these four directional inputs are provided, four directional outputs of the joysticks must be monitored by the CPU timing loops. It requires that the CPU constantly monitors the directional inputs of the game port while any timing loop is running in order to receive the input signals from the joysticks 13. To do this, the CPU must disable all interrupts. Consequently, all other programs must be disabled while playing games.

The integration method and apparatus of the present invention can overcome the difficulty and allow an external HSP modem to function while a joystick and a MIDI I/O device are playing without burdening down the system performance.

Figure 2:
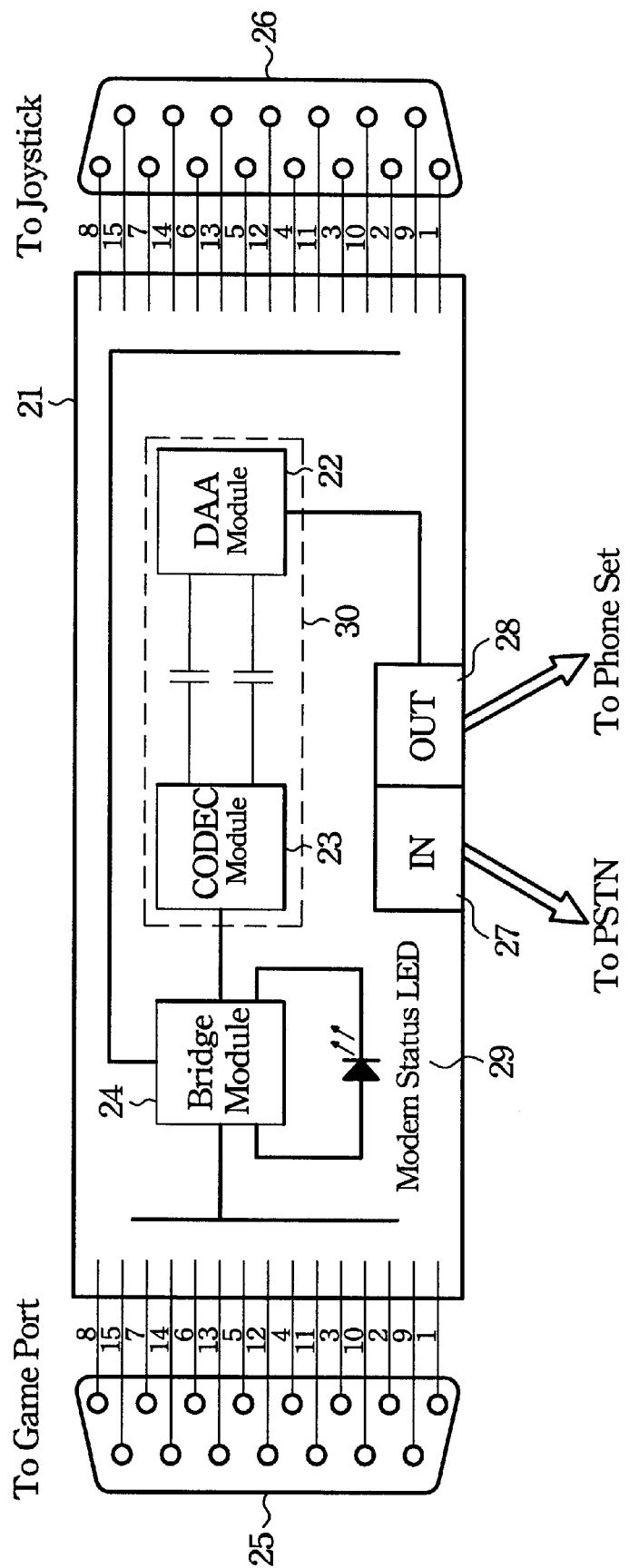
FIG. 2 is a block diagram showing the external HSP modem adaptable to a game port according to the preferred embodiment of the present invention.

With reference to FIG. 2, it shows a schematic block diagram of an external HSP modem according to the preferred embodiment of the present invention. The external HSP modem 21 is housed in a compact case with two connectors 25, 26 at two opposite ends. The connector 25 is adaptable to a standard PC game port while the connector 26 to a joystick and a MIDI interface. It is also equipped with a pair of phone jacks 27, 28 on one side of the compact case for connecting to a telephone line and a telephone set respectively.

The external HSP modem 21 comprises two functional portions: a modem module 30 and a bridge module 24. The modem module 30 which comprises a DAA module 22 and a CODEC module 23, is available as an integrated circuit chip and is sold as a modem chip set by various semiconductor manufactures. The DAA module 22 is coupled using ring path and tip path to the phone jacks 27, 28 for communicating with the PSTNs. The DAA module 22 preconditions signals to and from the PSTNs as well as providing signal protection, required when connecting to various PSTNs, to form preconditioned analog signals on path. The preconditioned analog signals are bidirectionally input to the CODEC module 23. The CODEC module 23 performs digital to analog and analog to digital conversions of modulated data as well as signal amplification and echo canceling. It allows the received signal to be interpreted separately while on the same line as the transmitted signal. The DAA module 22 and the CODEC module 23 together adapts signal timing and bus isolation for each of the two modules.

The bridge module 24, which is coupled to a connector 25, a connector 26 and the modem module 30, is electrically configured to interface the external HSP modem and a standard PC game port. The bridge module 24 bidirectionally transfers data to the standard PC game port via connector 25 for modulation and demodulation. In addition, the bridge module 24 is also coupled to a status LED 29 for automatically signaling the on/off status of the external HSP modem 21.

Figure 3A:
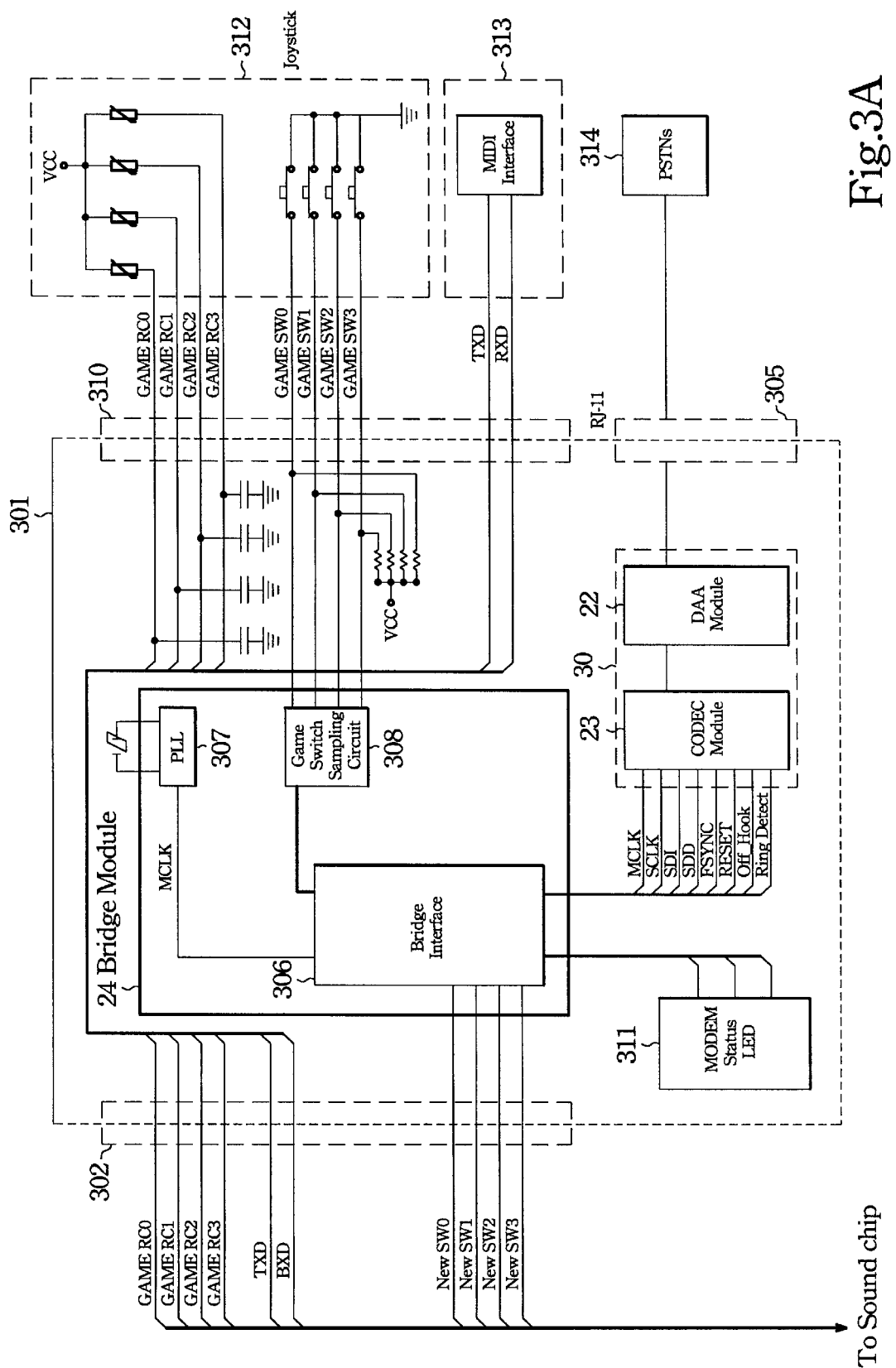
FIGS. 3A and 3B are detailed system block diagrams showing the integration system according to the preferred embodiment of the present invention.

Refer to FIG. 3A for the detailed system diagram of the external HSP modem according to the preferred embodiment of the present invention. The external HSP modem case 301 includes two major portions: the modem module 30 and the bridge module 24. The modem module 30 includes the DAA module 22, and the CODEC module 23 which are available as integrated circuit chips. The DAA module 22 is coupled to the RJ-11 connector 305 using ring path and tip path for communicating with the PSTNs 314. The CODEC module 23 is coupled to a bridge interface 306 in the bridge module 24 for transferring data signals and command signals from DAA module 22 to the game port 302. The data signals include: serial port clocks (SCLK), data input (SDI), data output (SDO), and frame synchronization (FSYNC), and master clocks (MCLK). The SDI is a 16-bit data slot for transmitting data input of the modem module 30. The SDO is also a 16-bit data slot for transmitting data output of the modem module 30. The FSYNC signals are for sampling data in response to the clocks input from the SCLK. The frame synchronization signal FSYNC determines the command cycle and data cycle for data frames and command frames. The command signals include: reset, Off$_{13}$ Hook, and ring detect for conventional telephone services.

Figure 4A:
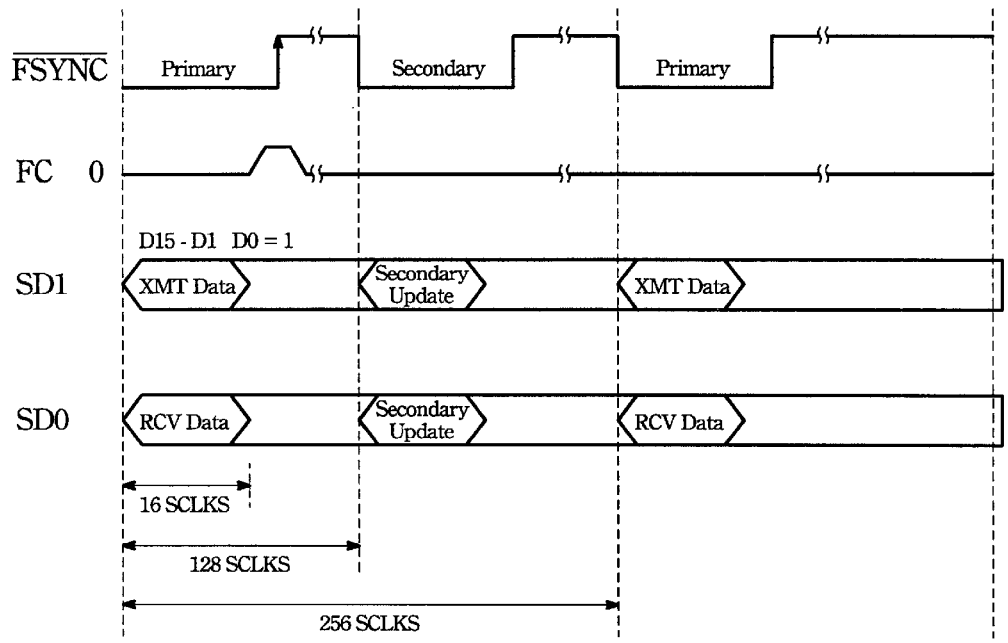
FIG. 4A is a timing diagram of a conventional DAA module.

Refer to FIG. 4A for the timing diagrams of these four signals generated by a conventional DAA module 22, namely FSYNC, FC, SDI and SDO. The sample rate for a communication frame is 256 SCLKs. That is, the SCLK runs at 256 bits per frame . There are two kinds of communications frames: the primary frame and the secondary frame. The primary frame occurs at the frame rate and are always present. The secondary frames are present only when requested. SDI and SDO are 16-bit data slots. The DAA module 22 transfers 16-bit or 15-bit telephony data in the primary timeslot and 16-bit control data in the secondary timeslot. So, the DAA module 22 uses only 32-bit. Consequently, the bandwidth left is still enough for transferring game port data and modem data.

Figure 4B:
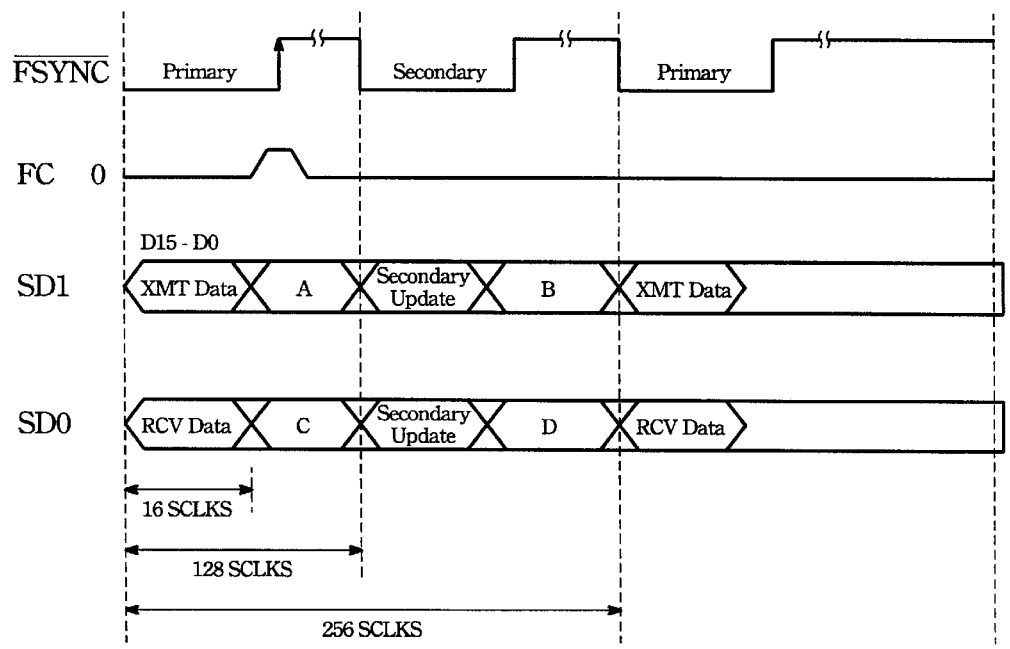
FIG. 4B is a timing diagram based on a conventional DAA module for transmitting game port data and modem data according to the preferred embodiment of the present invention.

The feature of the timing clocks of a conventional DAA module 22 allows the present invention to transmit modem data and game port data via the original read-only ports of the game port. To fully utilize the bandwidth, the timing diagrams of the SDI, SDO, FC and FSYNC according to the present invention is illustrated in FIG. 4B. The 224 clocks left can be shared with the game port data in a manner that the game port data and modem data denoted as "A" can be transmitted at the primary frame of SDI data slot while the ring detect denoted as "B" can be transferred using the secondary frame of the SDI data slot. The status LED signals denoted as "C" can be transmitted at the primary frame of SDO data slot and the modem command signals denoted as "D" can be transmitted via the secondary frame of the SDO data slot. Accordingly, the invention can simultaneous transmit the data signals and command signals while communicating with the external HSP modem, the joystick, and the MIDI interface.

The bridge module 24 mainly comprises: a bridge interface 306, a game switch sampling circuit 308 and a master clock generator 307. The bridge interface 306 uses four pins of the original game port for transferring command signals and data signals. These four pins are originally for transferring SCLK, SDI, SDO, and FSYNC signals, now redefined as SW0, SW1, SW2, and SW3. Since the bridge interface 306 transfers data in response to the SCLKs. The transmission of the command signals and data signals for the HSP modem will use the bandwidth left as illustrated in FIG. 4B.

In addition, the bridge interface 306 also transmits data from the joystick 313 using these four pins since the bandwidth is still enough. Originally, the binary signals from the joystick 312 will be transferred to the game port latch device 317 (shown on FIG. 3B) on the sound chip 319 (shown on FIG. 3B) via the ports originally defined for SCLK, SDI, SDO, and FSYNC. After defining these four read-only pins, binary signals from the joystick 312 will be transferred to the game port latch device 317 via these read-only ports, namely SW0, SW1, SW2 and SW3. The binary signals from the joystick 312 will be transferred to the game switch sampling circuit 308 to be forwarded to the bridge interface 306. Since the binary signals depend on the button press speed of the joystick, therefore the bandwidth left is still enough for transmitting signals for even a digital joystick. for this reason, the bridge interface 306 will transmit the binary signals from the joystick 312 to the read-only ports. For this reason, the bridge interface 306 will transmit the binary signals from the joystick 312 to the read-only ports SW0, SW1, SW2, and SW3 in response to the SCLK.

The bridge interface 306 will then forward the binary signals to the game port latch device 317 on the sound chip 319. The application program of the joystick 312 will then read the data latched by the game port latch device 317 by polling mode. It is well known to the art that the game port polling mode is relatively low in speed comparing to the modem transmission speed. For this reason, the bandwidth of the game port can be fully utilized without causing the delay of data transmission. On the other hand, the directional signals from the joystick 312 will be sent to the game port latch device 317 via original ports, starting from resistor and capacitor ports of RC0, RC1, RC2 and RC3. The MIDI data output will be transmitted to the MIDI interface 313 via conventional transferring port of TXD while the MIDI data input receiving from the conventional receiving port of RXD.

In addition to the transmission of the data signals and game port data, the bridge interface 306 still can transfer command signals of reset, Off$_{13}$ Hook, and ring detect to the game port 302 in response to serial port clocks. Moreover, the bridge interface 306 is coupled to a status LED 311 for sending control signals to the status LED 311. The bridge interface 306 uses the SCLK signals for detecting the on/off status of the external HSP modem 301. If the bridge interface 306 does not get the SCLK signals, it indicates that the external HSP modem 301 is off or not well-plugged onto the game port 302. Then, the bridge interface 306 will send a control signal to the status LED 311 to turn the light off. On the other hand, if the bridge interface 306 can get the SCLK signals, it indicates that the connection between the external HSP modem 301 and the game port 302 has no problem. In that case, it will send a control signal to the status LED 311 to turn the light on.

The master clock generator 307 can be implemented as a phase lock loop (PLL) or a crystal to generate master clock signals MCLK for the modem module 30. The master clock generator 307 provides a standard frequency for the modem module 30 to generate a sample rate. The bridge interface 306 will then forward the master clocks from the master clock generator 307 to the CODEC module 23.

Figure 3B:
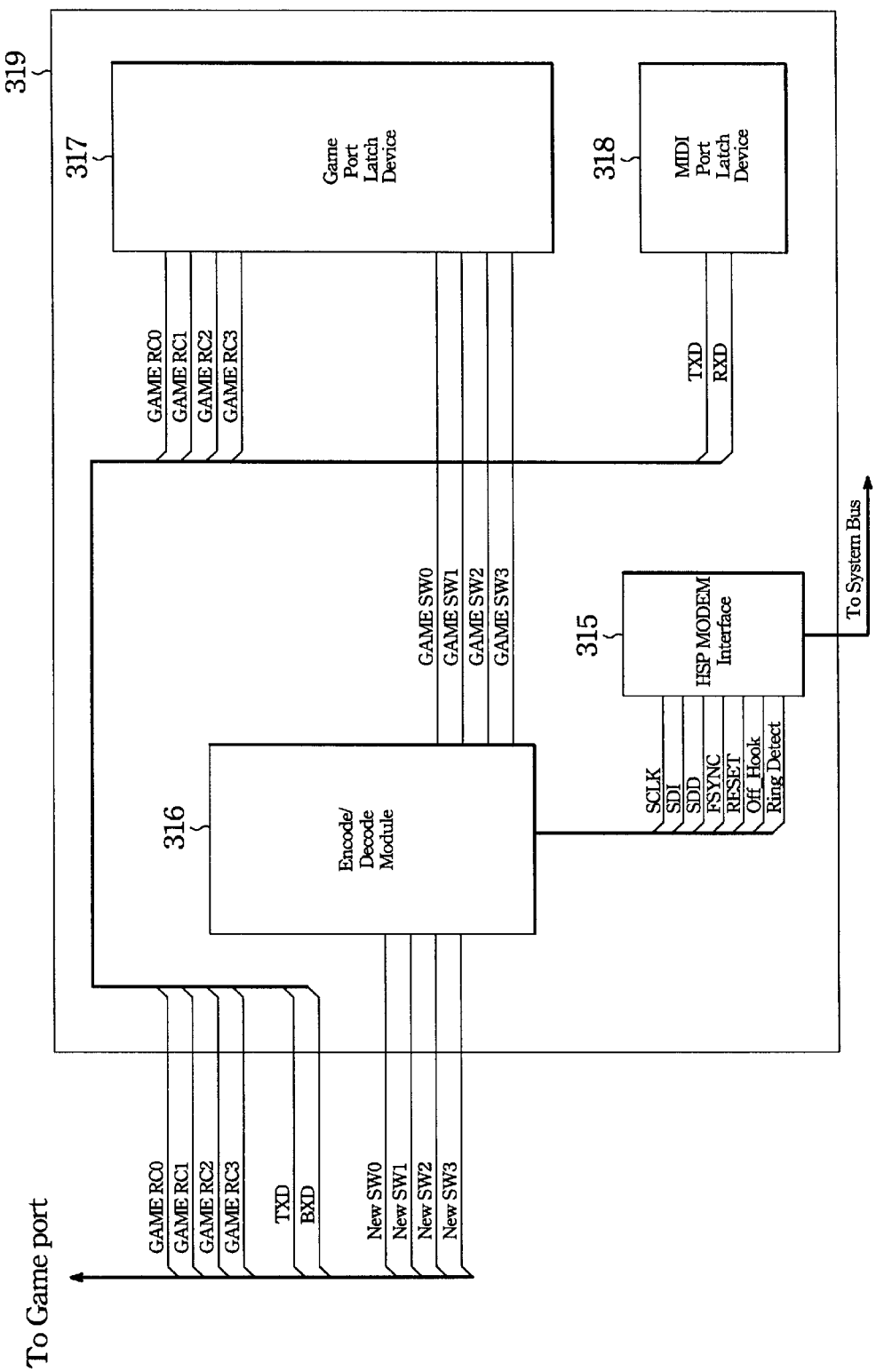

Refer to FIG. 3B, inside the personal computer, the bridge module 301 is coupled to a sound chip 319. The sound chip 319 comprises conventional elements, such as an HSP modem interface 315, a MIDI port latch device 318, and a game port latch device 318, and an encode/decode module 316 of the present invention. The encode/decode module 316 receives encoded data from the bridge interface 306 via the newly defined 4 read-only ports and then decodes and restores the input data into original formats. These decoded input data will be forwarded to the system bus, such as PCI/ISA bus, via HSP modem interface 315 for CPU to access. Consequently, the modem data output from the modem module 30 is completely transparent to the HSP modem interface 315 via the bridge interface 306 and the encode/decode module 316. Moreover, the game port data is also transparent to the game port latch device 31 7 and the MIDI port latch device 318. The sound chip 319 can provides conventional DSP-LINK, AC-LINK, or even the newly defined LINK for external HSP modem.

Figure 5:
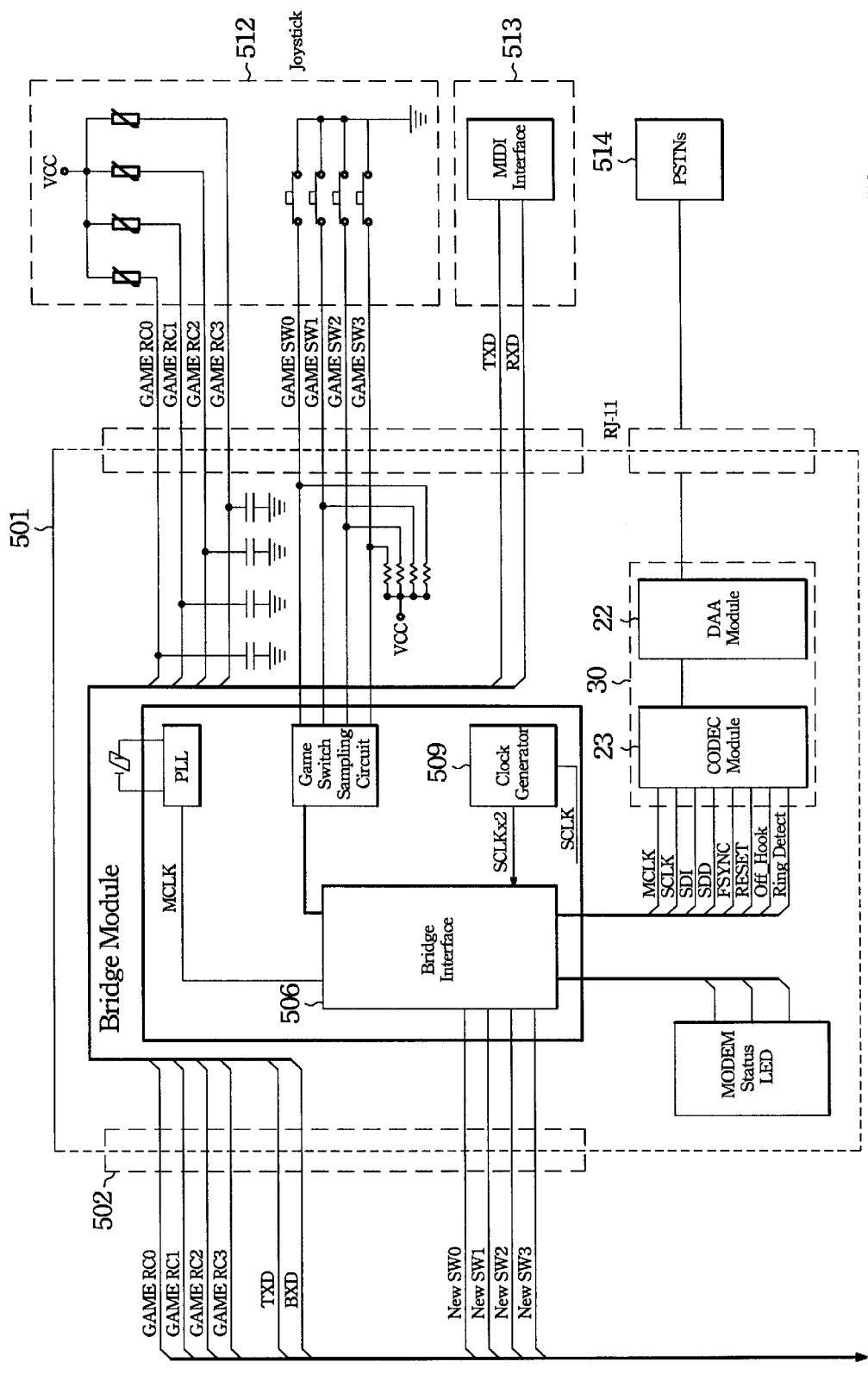
FIG. 5 is a detailed system block diagram showing the integration system according to another preferred embodiment of the present invention.

Another preferred embodiment of the present invention is illustrated in FIG. 5. FIG. 5 are basically the same as that of FIG. 3A except a speed-up clock generator 509 is added to the bridge module 24. In case that the bandwidth for the SDI, SDO, SCLK, and FC is not enough, the present invention can still solve the problem by adding a speed-up clock generator to compress the data. Refer to FIG. 5, a speed-up clock generator 509 is added to the bridge module 24. The speed-up clock generator 509 receives serial port clocks SCLK and then generates speed-up SCLK signals by doubling the original data clocks. The purpose of doubling the original clock cycles is to compress the data output of the bridge interface 506, thereby to save the bandwidth. It should be understood that doubling the original clock cycles is not a limitation of the present invention. The clock cycles can be speeded up according to practical applications. Nevertheless, according to the preferred embodiment of the present invention, doubling the original clock cycles is easy to implement and enough to save the bandwidth of the game port 502. The speed-up clock generator 509 can be implemented as a phase lock loop for automatically changing the phase of the serial port clock inputs. The speed-up SCLK signals are then input to the bridge interface 506 for transferring modulated and demodulated signals, including command signals and data signals, to the game port 502 via the bridge interface 506.

The bridge interface 506 functions the same as the bridge interface 306 in FIG. 3A. Since the bridge interface 506 transfers data in response to the speed-up SCLK signals, therefore the data transmitted to the game port 502 will be compressed. For instance, a sample rate of 10 K Hertz will now become 20 K Hertz. Since the bandwidth of PCI is about 33 Mega Hertz per second, the transmission of the command signals and data signals for the HSP modem via the high speed PCI bus does not affect the normal function of the game port. For this reason, the bandwidth left is still enough for the bridge interface 506 to transmit data from the joystick 513 using these four pins.

Moreover, the bridge interface 506 also uses the speed-up SCLK signals for detecting the on/off status of the external HSP modem 501. If the bridge interface 506 does not get the speed-up SCLK signals, it indicates that the external HSP modem 501 is off or not well-plugged onto the game port 502. On the other hand, the encode/decode module 516 receives data in response to the speed-up clock signals. Consequently, the bandwidth problem can be solved without affecting the functionality as described in FIG. 3A and 3B.

To sum up, the present invention successfully provides a method and apparatus which can simultaneously interface an external HSP modem, a joystick and a MIDI interface such that a user can play games and a MIDI keyboard while connecting to Internet via PSTNs. The external HSP modem of the invention also provides a solution for the motherboard manufactures to save the cost on an internal modem adapter cards by allowing users to upgrade their systems using an external HSP modem when needed.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. For instance, the speed-up clock generator 509 can be removed. The function of generating speed-up clocks can be performed using FSYNC signals of the game port. It is therefore intended that the appended claims encompass any such modifications or embodiments.

What is claimed is:

1. An external Host Signal Processor (HSP) modem adapted to a game port of a personal computer, comprising:
    a modem module connecting to a telephone network for transferring a plurality of modulated/demodulated signals comprising data signals and command signals, said data signals comprising master clocks, a plurality of serial port clocks, a data input, a data output, and a frame synchronization signal;
    bridge means coupled to said modem module for bi-directionally transferring said data signals and said command signals to said game port via a plurality of read-only ports in response to a plurality of serial port clocks;
    encode/decode means coupled to said bridge means via said plurality of read-only ports for communicating with a Host Signal Processor modem interface in response to said plurality of serial port clocks; and
    a game switch sampling circuit coupled to a joystick for transferring binary output of said joystick to said bridge interface.

2. The external HSP modem as claimed in claim 1, wherein said bridge means further comprises:
    speed-up clock generating means for increasing the speed of said plurality of serial port clocks.

3. The external HSP modem as claimed in claim 1, wherein said bridge means further comprises:
    status signaling means coupled to said bridge interface for indicating on/off status of said external HSP modem in response to said plurality of serial port clocks.

4. The external HSP modem as claimed in claim 1, wherein said plurality of read-only ports is originally for transferring said plurality of serial port clocks, said data input, said data output, and said frame synchronization signal and newly defined for transferring a plurality of modulated/demodulated signals in addition to said plurality of serial port clocks, said data input, said data output, and said framesynchronization signals.

5. The external HSP modem as claimed in claim 1, wherein said command signals comprise:
    Off-Hook, ring detect, and reset signals.

6. The external HSP modem as claimed in claim 2, wherein said speed-up serial port clocks are generated by doubling said plurality of serial port clocks.

7. The external HSP modem as claimed in claim 1, wherein said bridge means further comprises:
    master clock generating means for generating a plurality of master clocks to said bridge interface.

8. The external HSP modem as claimed in claim 1, further comprising:
    a compact housing having a first connector residing on one end of said compact housing for mounting on said game port, a second connector residing on another end of said compact housing for coupling to a plurality of game port devices, and a telephone connector for connecting to a telephone set and said telephone network.

9. The external HSP modem as claimed in claim 8, wherein said first connector is coupled to said second connector for transferring directional signals of said joystick to game port latch means via a plurality of resistor and capacitor ports, and transferring data input to MIDI port latch means via a transferring port and transferring data output from a MIDI interface via a receiving port.

10. The external HSP modem as claimed in claim 1, wherein said encode/decode means is mounted on a sound chip.

11. The external HSP modem as claimed in claim 10, wherein said sound chip comprises:
    game port latch means coupled to said encode/decode means for latching directional signals input from said joystick via said plurality of resistor and capacitor ports and binary signals input from said joystick via said read-only ports; and
    MIDI port latch means coupled to said game port for latching signals to/from said MIDI interface via said transferring port, and said receiving port.

12. A method for interfacing a modem module, a joystick and a MIDI interface on a game port of a personal computer, comprising the steps of:
    defining a plurality of read-only ports on said game port for transferring a plurality of modulated/demodulated signals of said modem module, said plurality of read-only ports are originally for transferring said plurality of serial port clocks, data input, data output, and frame synchronization signals and newly defined for transferring said modulated/demodulated signals;

sending said plurality of modulated/demodulated signals to encode/decode means residing inside said personal computer via said plurality of read-only ports for encoding/decoding said plurality of modulated/demodulated signals in response to said plurality of serial port clocks;

transferring said plurality of encoded/decoded modulated/demodulated signals to a system bus via an HSP modem interface;

transferring directional signals of said joystick to game port latch means via a plurality of resistor and capacitor ports;

transferring data output from MIDI port latch means to a MIDI interface via a transferring port; and transferring data output from said MIDI interface to said MIDI port latch means via a receiving port.

13. The method as claimed in claim 12, further comprising the steps of:

increasing the speed of serial port clocks for compressing modulated/demodulated signals.

14. The method as claimed in claim 12, wherein said modulated/demodulated signals comprise:

data signals and command signals.

15. The method as claimed in claim 12, further comprising the steps of:

transferring a plurality of binary signals of said joystick via said read-only ports in response to said serial port clocks.

16. The method as claimed in claim 12, further comprising the step of:

detecting an on/off status of said modem module responsive to said serial port clocks.

17. The method as claimed in claim 12, further comprising the step of:

generating a plurality of master clock signals to said modem module via said bridge interface for obtaining a frequency of a sample rate.

18. An apparatus adapted to a game port of a personal computer for interfacing a modem module, a joystick and a MIDI interface, comprising:

a modem module coupled to a telephone connector for communicating with a telephone network and generating modulated/demodulated signals which comprises data signals and command signals;

bridge means coupled to said modem module for inputting said modulated/demodulated signals, and generating modulated/demodulated signals responsive to a plurality of serial port clocks, and forwarding said modulated/demodulated signals to said game port via a plurality of read-only ports, said plurality of read-only ports are originally for transferring said serial port clocks, data input, data output, and frame synchronization signals, and newly defined for transferring said modulated/demodulated signals;

encode/decode means coupled to said bridge means via said plurality of read-only ports for decoding said modulated/demodulated signals; and a compact case for housing said modem module and said bridge means, and said compact case having a first connector residing on one end of said compact case for mounting on said game port, a second connector residing on another end of said compact case for coupling to a plurality of game port devices, and a phone connector for connecting to a telephone set and said telephone network.

19. The apparatus as claimed in claim 18, wherein said bridge means further comprises:

means for increasing the speed of serial port clocks.

20. The apparatus as claimed in claim 18, wherein said bridge means comprises:

a bridge interface coupled to said modem module for bidirectionally transferring said modulated/demodulated signals to said game port via said plurality of read-only ports in response to said serial port clocks.

21. The apparatus as claimed in claim 18, wherein said bridge means further comprises:

a game switch sampling circuit coupled to said joystick for transferring binary signals output of said joystick to said bridge interface.

22. The apparatus as claimed in claim 18, wherein said bridge means further comprises:

master clock generating means for generating a plurality of master clock signals to said bridge interface for computing a frequency of a sample rate.

23. The apparatus as claimed in claim 18, wherein said bridge means further comprises:

status signaling means coupled to said bridge interface for indicating on/off status of said compact case in response to said serial port clocks.

24. The apparatus as claimed in claim 18, wherein said encode/decode means is mounted on a sound chip.

25. The apparatus as claimed in claim 24, wherein said sound chip comprises:

game port latch means coupled to said encode/decode means for latching directional signals input from said joystick via a plurality of resistor and capacitor ports and binary signals input from said joystick via said read-only ports;

MIDI port latch means coupled to said game port for latching signals to/from said MIDI interface via said transferring port, and said receiving port; and an HSP modem interface coupled to said encode/decode means for forwarding said decoded modulated/demodulated signals output from said encode/decode means to a system bus.

26. An external Host Signal Processor (HSP) modem adapted to a game port of a personal computer, comprising:

a modem module adapted to generate a communication frame and connecting to a telephone network by said communication frame for transferring a plurality of modulated/demodulated signals comprising data signals and command signals, said data signals comprising master clocks, a plurality of serial port clocks, a data input, a data output and a frame synchronization signal;

a bridge means coupled to said modem module comprising:

a game switch sampling circuit adapted to coupling to a joystick for transferring a binary output of said joystick to a bridge interface, said bridge interface coupled to said modem module and said game switch sampling circuit for encoding/decoding said data signals, said command signals, and said binary output into said communication frame and bidirectionally transferring said communication frame to said game port via a plurality of read-only ports in response to a plurality of serial port clocks; and encode/decode means coupled to said bridge interface via said plurality of read-only ports for communicating with an HSP modem interface in response to said plurality of serial port clocks and encoding/decoding said communication frame.

27. The external HSP modem as claimed in claim 26, wherein said bridge means further comprises speed-up clock generating means for increasing the speed of said plurality of serial port clocks.

28. The external HSP modem as claimed in claim 26, wherein said bridge means further comprises status signaling means coupled to said bridge interface for indicating on/off status of said external HSP modem in response to said plurality of serial port clocks.

29. The external HSP modem as claimed in claim 26, wherein said plurality of read-only ports are originally for transferring said plurality of serial port clocks,. data input, data output, and frame synchronization signals and newly defined for transferring said plurality of modulated/demodulated signals in addition to said plurality of serial port clocks, said data input, said data output, and said frame synchronization signals.

30. The external HSP modem as claimed in claim 26, wherein said data signals comprise master clocks, a plurality of serial port clocks, data input, data output, and frame synchronization signals.

31. The external HSP modem as claimed in claim 26, wherein said command signals comprise Off-Hook, ring detect, and reset signals.

32. The external HSP modem as claimed in claim 27, wherein said speed-up clock generating means double the clock-speed of said plurality of serial port clocks.

33. The external HSP modem as claimed in claim 26, wherein said bridge means further comprises master clock generating means for generating a plurality of master clocks to said bridge interface.

34. The external HSP modem as claimed in claim 26, further comprising:
a compact housing having a first connector residing on one end of said compact housing for mounting on said game port, a second connector residing on another end of said compact housing for coupling to a plurality of game port devices, and a telephone connector for connecting to a telephone set and said telephone network.

35. The external HSP modem as claimed in claim 34, wherein said first connector is coupled to said second connector for transferring directional signals of said joystick to game port latch means via a plurality of resistor and capacitor ports, and transferring data input to MIDI port latch means via a transferring port and transferring data output from a MIDI interface via a receiving port.

36. The external HSP modem as claimed in claim 26, wherein said encode/decode means is mounted on a sound chip.

37. The external HSP modem as claimed in claim 36, wherein said sound chip comprises:
game port latch means coupled to said encode/decode means for latching directional signals input from said joystick via said plurality of resistor and capacitor ports and binary signals input from said joystick via said read-only ports; and
MIDI port latch means coupled to said game port for latching signals to/from said MIDI interface via said transferring port, and said receiving port.

38. An apparatus adapted to an interface of a personal computer through a game port, comprising:
a bridge interface coupled to a modem module and a game switch sampling circuit and the game port;
encode/decode means coupled to said bridge interface via the game port, wherein said encode/decode means is located on a sound chip; and
a communication frame generated by said modem module and a plurality of modulated/demodulated signals transferred by said communication frame; wherein
said bridge interface encodes/decodes data signals received by said game switch sampling circuit into a communication frame generated by said modem module and transfers said communication frame via said game port to said encode/decode means, and said data signals and said modulated/demodulated signals are encoded/decoded by said encode/decode means.

39. An external Host Signal Processor (HSP) modem adapted to a game port of a personal computer, comprising:
a modem module connecting to a telephone network for transferring a plurality of modulated/demodulated signals comprising data signals and command signals, said data signals comprising master clocks, a plurality of serial port clocks, a data input, a data output, and a frame synchronization signals;
a compact housing on said modem module having a first connector residing on one end of said compact housing for mounting on said game port, a second connector residing on another end of said compact housing for coupling to a plurality of game port devices, and a telephone connector for connecting to a telephone set and said telephone network,
bridge means coupled to said modem module for bidirectionally transferring said data signals and said command signals to said game port via a plurality of read-only ports in response to a plurality of serial port clocks;
encode/decode means coupled to said bridge interface via said plurality of read-only ports for communicating with an HSP modem interface in response to said plurality of serial port clocks;
a game switch sampling circuit coupled to a joystick for transferring binary output of said joystick to said bridge interface;
game port latch means coupled to said encode/decode means for latching directional signals input from said joystick via said plurality of resistor and capacitor ports and binary signals input from said joystick via said read-only ports; and
MIDI port latch means coupled to said game port for latching signals to/from said MIDI interface via said transferring port, and said receiving port.

40. A method for interfacing a modem module, a joystick and a MIDI interface on a game port of a personal computer, comprising the steps of:
defining a plurality of read-only ports on said game port for transferring a plurality of modulated/demodulated signals of said modem module, said plurality of read-only ports are originally for transferring said plurality of serial port clocks, data input, data output, and frame synchronization signals and newly defined for transferring said modulated/demodulated signals;
sending said plurality of modulated/demodulated signals to encode/decode means residing inside said personal computer via said plurality of read-only ports for encoding/decoding said plurality of modulated/demodulated signals in response to said plurality of serial port clocks;

transferring said plurality of encoded/decoded modulated/demodulated signals to a system bus via an HSP modem interface;

transferring directional signals of said joystick to game port latch means via a plurality of resistor and capacitor ports;

transferring data output from MIDI port latch means to a MIDI interface via a transferring port; and transferring data output from said MIDI interface to said MIDI port latch means via a receiving port.

41. An apparatus adapted to a game port of a personal computer for interfacing a modem module, a joystick and a MIDI interface, comprising:

a modem module coupled to a telephone connector for communicating with a telephone network and generating modulated/demodulated signals which comprises data signals and command signals;

bridge means coupled to said modem module for inputting said modulated/demodulated signals, and generating modulated/demodulated signals responsive to a plurality of serial port clocks, and forwarding said modulated/demodulated signals to said game port via a plurality of read-only ports, said plurality of read-only ports are originally for transferring said serial port clocks, data input, data output, and frame synchronization signals, and newly defined for transferring said modulated/demodulated signals;

encode/decode means coupled to said bridge means via said plurality of read-only ports for decoding said modulated/demodulated signals; and a compact case for housing said modem module and said bridge means, and said compact case having a first connector residing on one end of said compact case for mounting on said game port, a second connector residing on another end of said compact case for coupling to a plurality of game port devices, and a phone connector for connecting to a telephone set and said telephone network.

* * * * *